US012723156B2

(12) United States Patent
Sakai et al.

(10) Patent No.: US 12,723,156 B2
(45) Date of Patent: Sep. 1, 2026

(54) POLYIMIDE RESIN COMPOSITION AND MOLDED BODY

(71) Applicant: MITSUBISHI GAS CHEMICAL COMPANY, INC., Chiyoda-ku (JP)

(72) Inventors: Atsushi Sakai, Kanagawa (JP); Yuuki Sato, Kanagawa (JP); Takuya Fukushima, Kanagawa (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 683 days.

(21) Appl. No.: 18/044,918

(22) PCT Filed: Sep. 10, 2021

(86) PCT No.: PCT/JP2021/033232

§ 371 (c)(1),
(2) Date: Mar. 10, 2023

(87) PCT Pub. No.: WO2022/065063

PCT Pub. Date: Mar. 31, 2022

(65) Prior Publication Data

US 2023/0340263 A1 Oct. 26, 2023

(30) Foreign Application Priority Data

Sep. 23, 2020 (JP) ................................ 2020-158746

(51) Int. Cl.
*C08L 79/08* (2006.01)
*C08L 81/06* (2006.01)

(52) U.S. Cl.
CPC ............... *C08L 79/08* (2013.01); *C08L 81/06* (2013.01)

(58) Field of Classification Search
CPC ..... C08L 79/08; C08L 81/06; C08G 73/1042; C08G 73/10
See application file for complete search history.

(56) References Cited

U.S. PATENT DOCUMENTS 5,321,096 A 6/1994 Okawa et al.
5,401,812 A 3/1995 Yamamoto et al.
(Continued)

FOREIGN PATENT DOCUMENTS

CA 1 232 390 A 2/1988
JP 1-279965 A 11/1989
(Continued)

OTHER PUBLICATIONS

English Translation of KR1020155610 (Year: 2014).*

*Primary Examiner* — John M Cooney
*Assistant Examiner* — Adam J Berro
(74) *Attorney, Agent, or Firm* — Oblon, McClelland, Maier & Neustadt, L.L.P.

(57) ABSTRACT

A polyimide resin composition having a polyimide resin (A) and a polyether sulfone resin (B), wherein the polyimide resin (A) comprises a repeating structural unit of formula (1) and a repeating structural unit of formula (2), a content ratio of the repeating structural unit of the formula (1) to a total of the repeating structural units of the formula (1) and formula (2) is 20 to 70 mol %, and a mass ratio of component (A) to component (B), [(A)/(B)], is 0.1/99.9 to 65/35; and a molded article containing the same:

(1)

(Continued)

-continued (2)

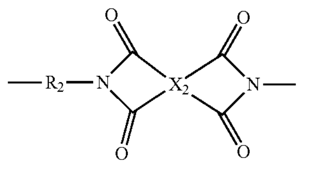

where $R_1$ represents a divalent group of 6 to 22 carbon atoms with an alicyclic hydrocarbon structure; $R_2$ represents a divalent chain aliphatic group of 5 to 16 carbon atoms; and $X_1$ and $X_2$ each independently represent a tetravalent group of 6 to 22 carbon atoms and having an aromatic ring.

6 Claims, 2 Drawing Sheets

(56) References Cited

U.S. PATENT DOCUMENTS

| | | | | |
|---|---|---|---|---|
| 2014/0200325 | A1 | 7/2014 | Sato et al. | |
| 2017/0130003 | A1* | 5/2017 | Sato | C08G 73/1082 |
| 2017/0275425 | A1* | 9/2017 | Sato | C08J 5/18 |
| 2019/0218393 | A1 | 7/2019 | Patil et al. | |
| 2020/0207984 | A1 | 7/2020 | Ito | |
| 2021/0253856 | A1 | 8/2021 | Sakai et al. | |

FOREIGN PATENT DOCUMENTS

| | | | | |
|---|---|---|---|---|
| JP | 2001-139813 A | | 5/2001 | |
| JP | 2005-28524 A | | 2/2005 | |
| JP | 2009-155354 A | | 7/2009 | |
| JP | 2012-25847 A | | 2/2012 | |
| JP | 2018-70699 A | | 5/2018 | |
| WO | WO-2012054595 A1 | * | 4/2012 | C08G 73/1046 |
| WO | WO 2020/058790 A1 | | 3/2020 | |

* cited by examiner

POLYIMIDE RESIN COMPOSITION AND MOLDED BODY

CROSS-REFERENCE TO RELATED APPLICATIONS

The present application is a 35 U.S.C. § 371 National Stage Application of International Patent Application PCT/JP2021/033232, filed Sep. 10, 2021, which is based on and claims the benefit of priority to Japanese Application No. 2020-158746, filed Sep. 23, 2020. The entire contents of these applications are incorporated herein by reference.

TECHNICAL FIELD

The present invention relates to a polyimide resin composition and a molded article.

BACKGROUND ART

A polyimide resin is a useful engineering plastic that has high thermal stability, high strength and high solvent resistance due to the stiffness, resonance stabilization and strong chemical bonds of the molecular chain thereof, and is being applied to a wide range of fields. A polyimide resin having crystallinity can be further enhanced in the heat resistance, the strength and the chemical resistance thereof, and thus is expected for applications as alternatives of metals or the like. While a polyimide resin has high heat resistance, however, it has the problems of exhibiting no thermoplasticity and having low molding processability.

Vespel (registered trademark), a highly heat-resistant resin, is known as a polyimide molding material (PTL 1). This resin is difficult to process by molding due to its very low flowability even at a high temperature, and is also disadvantageous in terms of cost because it requires molding under conditions of a high temperature and a high pressure for a prolonged period of time. In contrast to this, a resin having a melting point and flowability at a high temperature, such as a crystalline resin, may be processed by molding easily and inexpensively.

Thus, a polyimide resin having thermoplasticity has been reported in recent years. Such a thermoplastic polyimide resin is excellent in molding processability in addition to the original heat resistance of the polyimide resin. The thermoplastic polyimide resin is therefore applicable to a molded article for use in an inhospitable environment to which nylon or polyester, a general purpose thermoplastic resin, is inapplicable.

For example, Patent Literature 2 discloses a thermoplastic polyimide resin containing a predetermined repeating structural unit obtained by reacting a tetracarboxylic acid and/or derivative thereof containing at least one aromatic ring, a diamine containing at least one alicyclic hydrocarbon structure, and a chain aliphatic diamine.

In the engineering plastics field, a technique of compounding and alloying two or more thermoplastic resins is also known for the purpose of improving physical properties, imparting functions according to the application, and the like. Patent Literature 3 discloses a thermoplastic polyimide resin containing a predetermined repeating unit, and also describes that this polyimide resin is used as a polymer alloy in combination with other resins. Patent Literature 4 discloses that a polyimide resin composition containing a polyetherimide resin and a crystalline polyimide resin containing a tetracarboxylic acid component and an aliphatic diamine component has excellent heat resistance, stiffness, and impact resistance.

CITATION LIST

Patent Literature

PTL 1: JP 2005-28524 A
PTL 2: WO 2013/118704
PTL 3: WO 2016/147996
PTL 4: JP 2018-70699 A

SUMMARY OF INVENTION

Technical Problem

The thermoplastic polyimide resin described in Patent Literature 3 is crystalline, and has excellent heat resistance, strength, chemical resistance, and the like, but there is room for further improvement in terms of tensile properties, particularly toughness, among mechanical properties. It is considered that when toughness is improved, impact resistance, vibration control, and the like are also improved, and development can be expected to applications where importance is placed on those properties. The improvement of toughness referred to here means that elongation until break when tensile stress is applied to the molded article increases, and can be evaluated by measuring the tensile fracture strain, for example.

In the examples of Patent Literature 4, the tensile modulus and the tensile elongation at break of a molded article composed of a polyimide resin composition containing a polyetherimide resin and a crystalline polyimide resin are evaluated, but a tensile break at elongation exceeding that of the crystalline polyimide resin alone was not obtained in any of the examples.

An object of the present invention is to provide a polyimide resin composition and a molded article having even better toughness while maintaining a high level of heat resistance, bending properties, and the like derived from the crystalline thermoplastic polyimide resin.

Solution to Problem

The present inventors have found that the aforementioned object can be attained by polyimide resin composition containing, in a predetermined mass ratio, a crystalline thermoplastic polyimide resin that is combined with a particular different polyimide structural unit in a particular ratio and a polyether sulfone resin.

That is, the present invention relates to the following.

[1] A polyimide resin composition containing a polyimide resin (A) and a polyether sulfone resin (B), wherein the polyimide resin (A) contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) is 20 to 70 mol %, and a mass ratio of the component (A) to the component (B), [(A)/(B)], is 0.1/99.9 to 65/35:

(1)

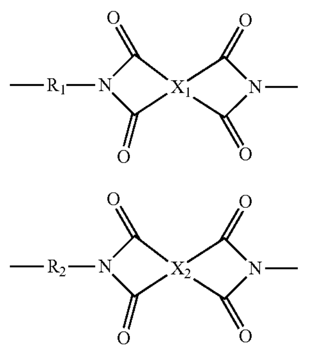

(2)

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

[2] A molded article containing the polyimide resin composition according to the above [1].

Advantageous Effects of Invention

The polyimide resin composition and molded article of the present invention have excellent heat resistance and bending properties and high toughness, and therefore is expected to be developed in applications where importance is placed on impact resistance, vibration control, and the like. For example, the polyimide resin composition and the molded article of the present invention can be applied to applications such as sliding members such as gears and bearings, cutting members, structural members such as robot arms, winding coating materials such as electric wires, screws, nuts, packings, speaker diaphragms, reflectors, fifth generation mobile communication system (5G) and sixth generation mobile communication system (6G) related members, various films, and the like. Further, as a use similar to that of a polyether sulfone resin, the polyimide resin composition and the molded article of the present invention also holds promise in applications in water-treated films and the like.

DESCRIPTION OF EMBODIMENTS

[Polyimide Resin Composition]

Figure 1:
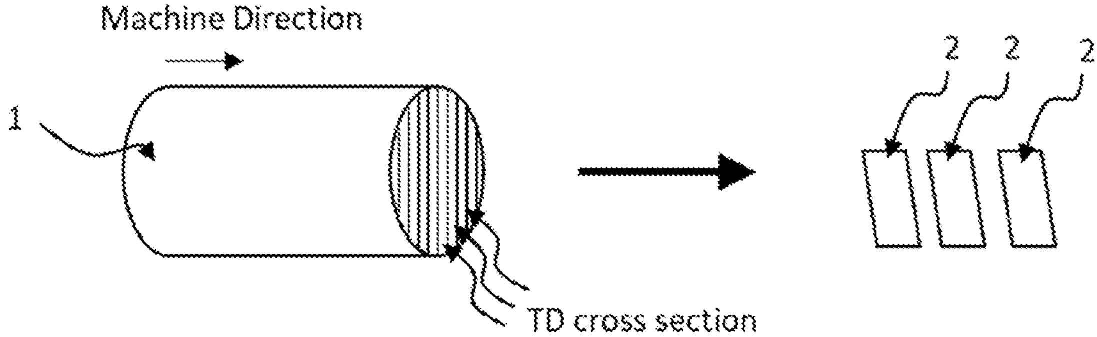
FIG. 1 is a schematic diagram showing a production method of a sample (ultra-thin piece) used in observation by a field-emission scanning transmission electron microscope (FE-STEM).

The polyimide resin composition of the present invention contains a polyimide resin (A) and a polyether sulfone resin (B), wherein the polyimide resin (A) contains a repeating structural unit represented by the following formula (1) and a repeating structural unit represented by the following formula (2), and a content ratio of the repeating structural unit of the formula (1) with respect to the total of the repeating structural unit of the formula (1) and the repeating structural unit of the formula (2) is 20 to 70 mol % and a mass ratio of the component (A) to the component (B), [(A)/(B)], is 0.1/99.9 to 65/35:

(1)

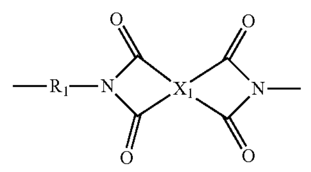

(2)

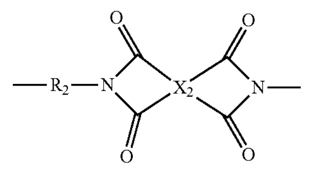

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

As a result of having the aforementioned structure, the polyimide resin composition of the present invention has even better toughness, while maintaining a high level of heat resistance, bending properties, and the like, than when component (A) alone or component (B) alone is used.

Although the reason for this is not certain, the component (A) is a crystalline thermoplastic resin, the component (B) is an amorphous thermoplastic resin, and since the mutual dispersibility of those components is high, it is considered that a resin composition and a molded article in which the component (A) is finely dispersed at a micro-level to nano-level are formed. Since a molded article in which the component (A) is finely dispersed at the micro-level to nano-level disperses stress when stress is applied, for example, it is thought that when tensile stress is applied, cracks occur in a complex manner inside the molded article and strain is alleviated at a plurality of locations, whereby toughness is improved.

<Polyimide Resin (A)>

The polyimide resin (A) used in the present invention contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %:

(1)

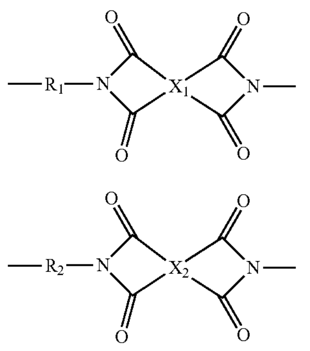

(2)

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

The polyimide resin (A) used in the present invention is a crystalline thermoplastic resin, which is preferably in a powder or pellet form. The thermoplastic polyimide resin is distinguished from, for example, polyimide resins formed by closing the imide ring after shaping in a state of a polyimide precursor such as a polyamic acid and having no glass transition temperature (Tg), or polyimide resins that decompose at a temperature lower than the glass transition temperature.

The repeating structural unit of formula (1) will be described in detail below.

$R_1$ represents a divalent group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

(R1-1)

(R1-2)

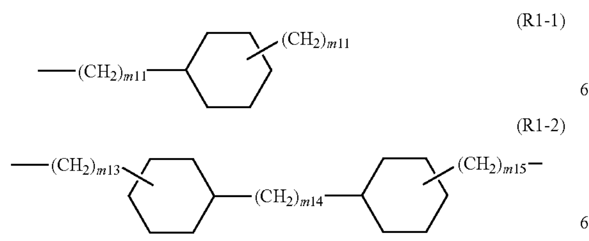

wherein $m_{11}$ and $m_{12}$ each independently represent an integer of 0-2, and preferably 0 or 1; and $m_{13}$ to $m_{15}$ each independently represent an integer of 0-2, and preferably 0 or 1.

$R_1$ is particularly preferably a divalent group represented by the following formula (R1-3):

(R1-3)

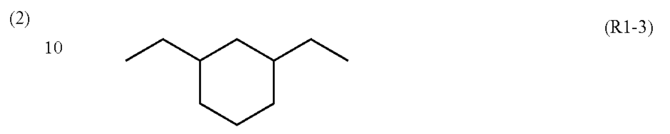

In the divalent group represented by the formula (R1-3), the conformation of the two methylene groups with respect to the cyclohexane ring may be either cis or trans, and the ratio of cis and trans may be an arbitrary value.

$X_1$ is a tetravalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4):

(X-1)

(X-2)

(X-3)

(X-4)

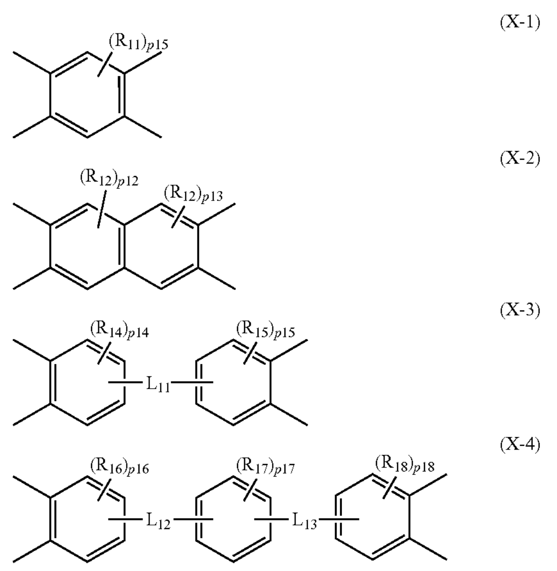

wherein $R_{11}$ to $R_{18}$ each independently represent an alkyl group having from 1 to 4 carbon atoms; $p_{11}$ to $p_{13}$ each independently represent an integer of 0-2, and preferably 0; $p_{14}$, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, a carbonyl group or an alkylene group having from 1 to 4 carbon atoms.

$X_1$ is a tetravalent group having from 6 to 22 carbon atoms containing at least one aromatic ring, and therefore $R_{12}$, $R_{13}$, $p_{12}$ and $p_{13}$ in the formula (X-2) are selected in such a manner that the tetravalent group represented by the formula (X-2) has from 10 to 22 carbon atoms.

Similarly, $L_{11}$, $R_{14}$, $R_{15}$, $p_{14}$ and $p_{15}$ in the formula (X-3) are selected in such a manner that the tetravalent group represented by the formula (X-3) has from 12 to 22 carbon atoms, and $L_{12}$, $L_{13}$, $R_{16}$, $R_{17}$, $R_{18}$, $p_{16}$, $p_{17}$ and $p_{18}$ in the formula (X-4) are selected in such a manner that the tetravalent group represented by the formula (X-4) has from 18 to 22 carbon atoms.

$X_1$ is particularly preferably a tetravalent group represented by the following formula (X-5) or (X-6):

(X-5)

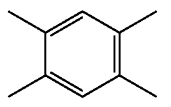

(X-6)

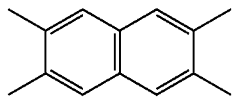

Next, the repeating structural unit of formula (2) will be described in detail below.

$R_2$ represents a divalent chain aliphatic group having from 5 to 16 carbon atoms, preferably from 6 to 14 carbon atoms, more preferably from 7 to 12 carbon atoms, and further preferably from 8 to 10 carbon atoms. The chain aliphatic group herein means a group derived from a chain aliphatic compound, and the chain aliphatic compound may be either saturated or unsaturated, may be in the form of either linear or branched chain.

$R_2$ is preferably an alkylene group having from 5 to 16 carbon atoms, more preferably an alkylene group having from 6 to 14 carbon atoms, further preferably an alkylene group having from 7 to 12 carbon atoms, and particularly preferably an alkylene group having from 8 to 10 carbon atoms. The alkylene group may be either a linear alkylene group or a branched alkylene group, and is preferably a linear alkylene group.

$R_2$ preferably represents at least one selected from the group consisting of an octamethylene group and a decamethylene group, and particularly preferably represents an octamethylene group.

$X_2$ is defined similarly to $X_1$ in the formula (1), and preferred embodiments thereof are also the same.

The content ratio of the repeating structural unit of the formula (1) with respect to the total of the repeating structural unit of the formula (1) and the repeating structural unit of the formula (2) is 20 mol % to 70 mol %. In the case where the content ratio of the repeating structural unit of the formula (1) is in the above range, the polyimide resin may also be sufficiently crystallized in an ordinary injection molding cycle. When the content ratio is less than 20 mol %, molding processability is deteriorated, and when the content ratio is more than 70 mol %, crystallinity is deteriorated to thereby result in deterioration in heat resistance.

The content ratio of the repeating structural unit of the formula (1) with respect to the total of the repeating structural unit of the formula (1) and the repeating structural unit of the formula (2) is preferably 65 mol % or less, more preferably 60 mol % or less, further preferably 50 mol % or less, and still further preferably less than 40 mol % from the viewpoint of exerting high crystallinity.

When the content ratio of the repeating structural unit of the formula (1) with respect to the total of the repeating structural unit of the formula (1) and the repeating structural unit of the formula (2) is 20 mol % or more and less than 40 mol %, the crystallinity of the polyimide resin (A) increases, and it is possible to obtain a resin molded article being more excellent in heat resistance. The content ratio described above is preferably 25 mol % or more, more preferably 30 mol % or more, further preferably 32 mol % or more from the viewpoint of molding processability, and is still further preferably 35 mol % or less from the viewpoint of exerting high crystallinity.

The content ratio of the total of the repeating structural unit of the formula (1) and the repeating structural unit of the formula (2) with respect to the total repeating structural units constituting the polyimide resin (A) is preferably 50 to 100 mol %, more preferably 75 to 100 mol %, further preferably 80 to 100 mol %, and still further preferably 85 to 100 mol %.

The polyimide resin (A) may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

When containing the repeating structural unit of formula (3), from the viewpoint of improving heat resistance, the content ratio is preferably 5 mol % or more, and more preferably 10 mol % or more, while from the viewpoint of maintaining crystallinity, the content ratio is preferably 20 mol % or less, and more preferably 15 mol % or less:

(3)

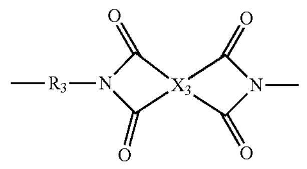

wherein $R_3$ represents a divalent group having from 6 to 22 carbon atoms containing at least one aromatic ring; and $X_3$ represents a tetravalent group having from 6 to 22 carbon atoms containing at least one aromatic ring.

$R_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

$R_3$ contains at least one aromatic ring, and preferably contains from 1 to 3 aromatic rings.

$R_3$ is preferably a divalent group represented by the following formula (R3-1) or (R3-2):

(R3-1)

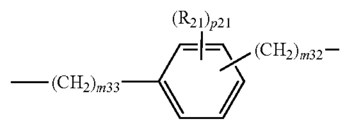

-continued (R3-2)

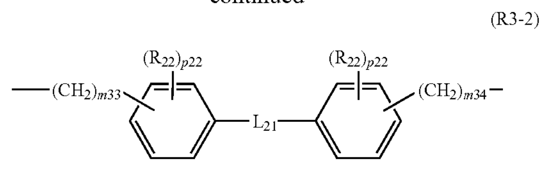

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of 0-4, and preferably 0; and $L_{21}$ represents a single bond, a carbonyl group or an alkylene group having from 1 to 4 carbon atoms. $R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.

$X_3$ is defined similarly to $X_1$ in the formula (1), and preferred embodiments thereof are also the same.

The end structure of the polyimide resin (A) is not particularly limited, and preferably has a chain aliphatic group having 5 to 14 carbon atoms at the end thereof.

The chain aliphatic group may be either saturated or unsaturated, and may be in the form of either linear or branched chain. When the polyimide resin (A) contains the above particular group at the end thereof, it is possible to obtain a resin composition excellent in heat aging resistance.

Example of the saturated chain aliphatic group having from 5 to 14 carbon atoms include an n-pentyl group, an n-hexyl group, an n-heptyl group, an n-octyl group, an n-nonyl group, an n-decyl group, an n-undecyl group, a lauryl group, an n-tridecyl group, an n-tetradecyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, an isododecyl group, an isotridecyl group and an isotetradecyl group.

Example of the unsaturated chain aliphatic group having from 5 to 14 carbon atoms include a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, a dodecenyl group, a tridecenyl group and a tetradecenyl group.

Among these, the chain aliphatic group is preferably a saturated chain aliphatic group, and more preferably a saturated linear aliphatic group. The chain aliphatic group preferably has 6 or more carbon atoms, more preferably 7 or more carbon atoms and further preferably 8 or more carbon atoms, and preferably has 12 or less carbon atoms, more preferably 10 or less carbon atoms and further preferably 9 or less carbon atoms from the viewpoint of achievement of heat aging resistance. The chain aliphatic group may be adopted singly or in combinations of two or more.

The chain aliphatic group is particularly preferably at least one selected from the group consisting of an n-octyl group, an isooctyl group, a 2-ethylhexyl group, an n-nonyl group, an isononyl group, an n-decyl group and an isodecyl group, further preferably at least one selected from the group consisting of an n-octyl group, an isooctyl group, a 2-ethylhexyl group, an n-nonyl group, and an isononyl group, and most preferably at least one selected from the group consisting of an n-octyl group, an isooctyl group, and a 2-ethylhexyl group.

The polyimide resin (A) preferably contains only a chain aliphatic group having from 5 to 14 carbon atoms, besides a terminal amino group and a terminal carboxy group, at the end thereof from the viewpoint of heat aging resistance. When a group, besides the above groups, is contained at the end, the content thereof with respect to the chain aliphatic group having from 5 to 14 carbon atoms is preferably 10 mol % or less and more preferably 5 mol % or less.

The content of the chain aliphatic group having from 5 to 14 carbon atoms in the polyimide resin (A) is preferably 0.01 mol % or more, more preferably 0.1 mol % or more, and further preferably 0.2 mol % or more based on the total 100 mol % of the total repeating structural units constituting the polyimide resin (A) from the viewpoint of exerting excellent heat aging resistance. Further, to ensure a sufficient molecular weight and obtain good mechanical properties, the content of the chain aliphatic group having from 5 to 14 carbon atoms in the polyimide resin (A) is, with respect to a total of 100 mol % of all the repeating structural units constituting the polyimide resin (A), preferably 10 mol % or less, more preferably 6 mol % or less, further preferably 3.5 mol % or less, still further preferably 2.0 mol % or less, and even still further preferably 1.2 mol % or less.

The content of the chain aliphatic group having from 5 to 14 carbon atoms in the polyimide resin (A) can be determined by depolymerization of the polyimide resin (A).

The polyimide resin (A) preferably has a melting point of 360° C. or lower and a glass transition temperature of 150° C. or higher. The melting point of the polyimide resin (A) is more preferably 280° C. or higher and further preferably 290° C. or higher from the viewpoint of heat resistance, and is preferably 345° C. or lower, more preferably 340° C. or lower, and further preferably 335° C. or lower from the viewpoint of exerting high molding processability. In addition, the glass transition temperature of the polyimide resin (A) is more preferably 160° C. or higher and more preferably 170° C. or higher from the viewpoint of heat resistance, and is preferably 250° C. or lower, more preferably 230° C. or lower, and further preferably 200° C. or lower from the viewpoint of exerting high molding processability.

In addition, in the polyimide resin (A), the exothermic amount (hereinafter, also simply referred to as "exothermic amount of crystallization") of the crystallization exothermic peak observed in melting and then cooling of the polyimide resin at a cooling rate of 20° C./min with differential scanning calorimetric measurement is preferably 5.0 mJ/mg or more, more preferably 10.0 mJ/mg or more, and further preferably 17.0 mJ/mg or more from the viewpoint of enhancement of crystallinity, heat resistance, mechanical strength, and chemical resistance. The upper limit of the exothermic amount of crystallization is not particularly limited, and is usually 45.0 mJ/mg or less.

The melting point, glass transition temperature, and exothermic amount of crystallization of the polyimide resin (A) can all be measured by a differential scanning calorimeter, and specifically, can be measured by the methods described in the examples.

The weight average molecular weight Mw of the polyimide resin (A) is preferably in the range of 10,000 to 150,000, more preferably 15,000 to 100,000, further preferably 20,000 to 80,000, still further preferably 30,000 to 70,000, and still further preferably 35,000 to 65,000. If the weight average molecular weight Mw of the polyimide resin (A) is 10,000 or more, the mechanical strength of the obtained molded article is good, and if Mw is 40,000 or more, the stability of the mechanical strength is good. Further, if Mw is 150,000 or less, the molding processability is good.

The weight average molecular weight Mw of the polyimide resin (A) can be measured by a gel permeation chromatography (GPC) method using polymethyl methacrylate (PMMA) as a standard sample, and specifically, can be measured by the method described in the examples.

The logarithmic viscosity of the polyimide resin (A) at 30° C. in a 5 mass % concentrated sulfuric acid solution is preferably in the range of 0.8 to 2.0 dL/g and more preferably 0.9 to 1.8 dL/g. If the logarithmic viscosity is 0.8 dL/g or more, sufficient mechanical strength can be obtained when formed as a molded article. If the logarithmic viscosity is 2.0 dL/g or less, molding processability and handleability are good. The logarithmic viscosity is obtained according to the following expression by measuring the elapsed times for flowing concentrated sulfuric acid and the polyimide resin solution at 30° C. with a Cannon-Fenske viscometer.

$$\mu = \ln[(ts/t_0)/C]$$

$t_0$: elapsed time for flowing concentrated sulfuric acid $t_S$: elapsed time for flowing polyimide resin solution C: 0.5 (g/dL)

(Method for Producing Polyimide Resin (A))

The polyimide resin (A) may be produced by reacting a tetracarboxylic acid component and a diamine component. The tetracarboxylic acid component contains a tetracarboxylic acid containing at least one aromatic ring and/or a derivative thereof, and the diamine component contains a diamine containing at least one alicyclic hydrocarbon structure and a chain aliphatic diamine.

The tetracarboxylic acid containing at least one aromatic ring is preferably a compound having four carboxy groups that are bonded directly to the aromatic ring, and may contain an alkyl group in the structure thereof. The tetracarboxylic acid preferably has from 6 to 26 carbon atoms. Preferred examples of the tetracarboxylic acid include pyromellitic acid, 2,3,5,6-toluenetetracarboxylic acid, 3,3',4,4'-benzophenonetetracarboxylic acid, 3,3',4,4'-biphenyltetracarboxylic acid and 1,4,5,8-naphthalenetetracarboxylic acid. Among these, pyromellitic acid is more preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate and dimethyl 1,4,5,8-naphthalenetetracarboxylate. The alkyl group in the alkyl ester compound of the tetracarboxylic acid preferably has from 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.0$^{2,6}$]decane, 3,3'-dimethyl-4,4'-diaminodicyclohexylmethane and 4,4'-diaminodicyclohexylpropane. These compounds may be used solely or may be used as a combination of two or more compounds selected therefrom. Among these, 1,3-bis(aminomethyl)cyclohexane is preferably used. A diamine containing an alicyclic hydrocarbon structure generally has conformational isomers, and the ratio of the cis isomer and the trans isomer is not particularly limited.

The chain aliphatic diamine may be in the form of either linear or branched chain, and has preferably from 5 to 16 carbon atoms, more preferably from 6 to 14 carbon atoms and further preferably from 7 to 12 carbon atoms. The linear moiety having from 5 to 16 carbon atoms may contain an ether bond in the course thereof. Preferred examples of the chain aliphatic diamine include 1,5-pentamethylenediamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof. Among these, a chain aliphatic diamine having from 8 to 10 carbon atoms can be preferably used, and at least one selected from the group consisting of 1,8-octamethylenediamine and 1,10-decamethylenediamine can be particularly preferably used.

In the production of the polyimide resin (A), the molar ratio of the charged amount of the diamine containing at least one alicyclic hydrocarbon structure with respect to the total amount of the diamine containing at least one alicyclic hydrocarbon structure and the chain aliphatic diamine is preferably 20 to 70 mol %. The molar ratio is preferably 25 mol % or more, more preferably 30 mol % or more, further preferably 32 mol % or more, and is preferably 60 mol % or less, more preferably 50 mol % or less, further preferably less than 40 mol %, and further preferably 35 mol % or less from the viewpoint of exerting high crystallinity.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the diamine containing at least one alicyclic hydrocarbon structure and the chain aliphatic diamine is preferably 25 mol % or less, more preferably 20 mol % or less, further preferably 15 mol % or less.

The lower limit of the molar ratio is not particularly limited, is preferably 5 mol % or more, and more preferably 10 mol % or more, from the viewpoint of enhancement of the heat resistance.

On the other hand, the molar ratio is still further preferably 12 mol % or less, still further preferably 10 mol % or less, still further preferably 5 mol % or less and still further preferably 0 mol % from the viewpoint of a decrease in coloration of the polyimide resin.

In the production of the polyimide resin (A), the charged amount ratio of the tetracarboxylic acid component and the diamine component is preferably from 0.9 to 1.1 mol of the diamine component per 1 mol of the tetracarboxylic acid component.

In the production of the polyimide resin (A), an end capping agent may be mixed in addition to the tetracarboxylic acid component and the diamine component. The end capping agent is preferably at least one selected from the group consisting of a monoamine compound and a dicarboxylic acid compound. It is sufficient for the amount of the end capping agent used to be an amount in which a desired amount of the end group can be introduced into the polyimide resin (A). This used amount is, based on one mole of the tetracarboxylic acid and/or derivative thereof, preferably from 0.0001 to 0.1 moles, more preferably from 0.001 to 0.06 moles, further preferably from 0.002 to 0.035 moles, still further preferably from 0.002 to 0.020 moles, and even still further preferably from 0.002 to 0.012 moles.

Among them, monoamine end capping agents are preferable as the end capping agent, and from the viewpoint of introducing the above-described chain aliphatic group having 5 to 14 carbon atoms at an end of the polyimide resin (A) to improve heat aging resistance, a monoamine that has a chain aliphatic group having 5 to 14 carbon atoms is more preferable, and a monoamine that has a saturated linear aliphatic group having 5 to 14 carbon atoms is further preferable.

The end capping agent is particularly preferably at least one selected from the group consisting of n-octylamine, isooctylamine, 2-ethylhexylamine, n-nonylamine, isononylamine, n-decylamine, and isodecylamine, further preferably at least one selected from the group consisting of n-octylamine, isooctylamine, 2-ethylhexylamine, n-nonylamine, and isononylamine, and most preferably at least one selected from the group consisting of n-octylamine, isooctylamine, and 2-ethylhexylamine.

As a polymerization method for producing the polyimide resin (A), a known polymerization method may be applied, and the method described in WO 2016/147996 can be used.

<Polyether Sulfone Resin (B)>

The polyimide resin composition of the present invention contains the polyimide resin (A) and the polyether sulfone resin (B) in a proportion of 0.1/99.9 to 65/35 as a mass ratio of the polyimide resin (A) to the polyether sulfone resin (B), [(A)/(B)]. By containing the polyimide resin (A) and the polyether sulfone resin (B) of a predetermined ratio, a polyimide resin composition and a molded article having better toughness while maintaining a high level of heat resistance, bending properties, and the like can be produced.

The polyether sulfone resin used as component (B) is an amorphous thermoplastic resin containing a repeating structural unit having an ether bond and a sulfonyl group. In the present invention, component (B) does not include an amorphous thermoplastic resin containing a repeating structural unit having an ether bond and a sulfonyl group and having an imide bond.

From the viewpoint of obtaining good heat resistance and toughness, the polyether sulfone resin (B) preferably contains at least one aromatic ring or alicyclic hydrocarbon structure, and more preferably contains an aromatic ring. The definitions of aromatic ring and alicyclic hydrocarbon structure are the same as above.

Examples of the polyether sulfone resin (B) include those containing a repeating structural unit represented by the following formula (4):

(4)

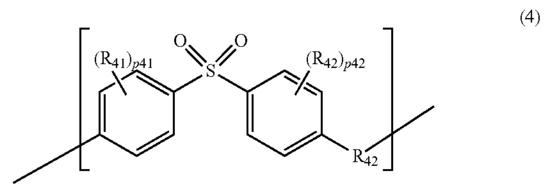

wherein $R_{41}$ and $R_{42}$ are each independently an alkyl group having from 1 to 4 carbon atoms, an alkenyl group having from 2 to 4 carbon atoms, or an alkynyl group having from 2 to 4 carbon atoms, $R_{43}$ is a divalent group containing an ether bond, and $p_{41}$ and $p_{42}$ are each independently an integer of from 0 to 4.

$R_{41}$ and $R_{42}$ are preferably alkyl groups having from 1 to 4 carbon atoms, and more preferably are methyl groups.

$R_{43}$ is preferably a divalent group represented by $—O—(CH_2)_{m42}—$, and $m_{42}$ is preferably from 0 to 4, more preferably from 0 to 3, and further preferably 0.

$p_{41}$ and $p_{42}$ are preferably from 0 to 2, and more preferably 0.

The polyether sulfone resin (B) is more preferably a resin having a structure represented by the following formula (I):

(I)

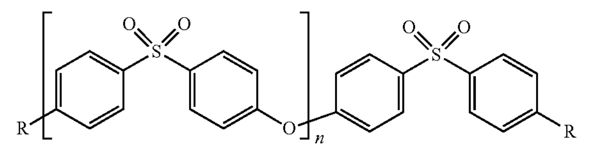

wherein R represents an end group, and is Cl or OH; and n represents an average number of repeating structural units, and is a number of two or more.

From the viewpoint of exerting higher toughness, R in formula (I) is preferably Cl. When R in formula (I) contains OH, the polyether sulfone resin has reactivity.

The glass transition temperature of the polyether sulfone resin (B) is preferably 210° C. or higher, and more preferably 215° C. or higher from the viewpoint of obtaining good heat resistance and toughness, and is preferably 280° C. or lower, and more preferably 260° C. or lower from the viewpoint of molding processability.

The glass transition temperature can be measured by the same method as described above.

The intrinsic viscosity at 25° C. of the polyether sulfone resin (B) is preferably 0.20 to 1.00 dL/g, more preferably 0.25 to 1.00 dL/g, further preferably 0.30 to 0.80 dL/g, and still further preferably 0.35 to 0.60 dL/g, from the viewpoint of obtaining good heat resistance and toughness.

The intrinsic viscosity of the polyether sulfone resin (B) can be measured by a method conforming to JIS K7367-5: 2000, and specifically, can be measured by the method described in the examples. The value of the intrinsic viscosity is preferably within the above range when measured at 25° C. using a polyether sulfone resin powder that has not been subjected to a thermal history, such as melting.

The number average molecular weight (Mn) of the polyether sulfone resin (B) is preferably 2,000 to 25,000, more preferably 3,000 to 25,000, further preferably 3,500 to 25,000, still further preferably 3,500 to 25,000, and even still further preferably 5,000 to 20,000 from the viewpoint of obtaining good heat resistance and toughness.

The weight average molecular weight (Mw) of the polyether sulfone resin (B) is preferably 5,000 to 80,000, more preferably 7,000 to 80,000, further preferably 8,000 to 80,000, still further preferably 8,000 to 60,000, even still further preferably 10,000 to 55,000, and even still further preferably 12,000 to 55,000, from the viewpoint of obtaining good heat resistance and toughness.

The number average molecular weight and weight average molecular weight of the polyether sulfone resin (B) can be measured by a gel permeation chromatography (GPC) method using polymethyl methacrylate (PMMA) as a standard sample, and specifically, can be measured by the methods described in the examples. The value of the number average molecular weight and weight-average molecular weight are preferably within the above range when measured using a polyether sulfone resin powder that has not been subjected to a thermal history, such as melting.

One type of the polyether sulfone resin (B) may be used alone, or two or more types may be used in combination. The form of the polyether sulfone resin (B) is not particularly limited, and either a powder or pellets can be used. A powder is more preferable from the viewpoint of improving dispersibility in the polyimide resin (A) and being able to maintain its nature in a state of not having been subjected to a thermal history, such as melting.

Commercially available products can also be used as the polyether sulfone resin (B). Examples of commercially available polyether sulfone resins include the "Sumika Excel PES" series (3600P, 4100P, 4800P, 5200P, 5400P, 5900P, 7600P, 5003P, 5003MPS, 3600G, 4100G, 4800G) produced by Sumitomo Chemical Co., Ltd., the "Ultrazone E" series (E1010, E2010, E2020P, E3010, E6020P) produced by BASF, and the like.

The mass ratio of the polyimide resin (A) to the polyether sulfone resin (B), [(A)/(B)], in the polyimide resin composition of the present invention is, from the viewpoint of obtaining good toughness, 0.1/99.9 to 65/35, preferably 1/99 to 65/35, more preferably 5/95 to 65/35, further preferably 10/90 to 65/35, still further preferably 15/85 to 60/40, even still further preferably 20/80 to 60/40, even still further preferably 25/75 to 60/40, and even still further preferably 25/75 to 55/45.

Further, from the viewpoint of obtaining the effects of the present invention, the total content of the polyimide resin (A) and the polyether sulfone resin (B) in the polyimide resin composition is preferably 50% by mass or more, more preferably 70% by mass or more, further preferably 80% by mass or more, still further preferably 90% by mass or more. The upper limit is 100% by mass.

<Additives>

The polyimide resin composition of the present invention may contain additives such as a filler, a reinforcement fiber, a delusterant, a nucleating agent, a plasticizer, an antistatic agent, an anti-coloring agent, an anti-gelling agent, a flame retardant, a colorant, a slidability improver, an antioxidant, a UV absorber, a conducting agent, and a resin-modifying agent, as necessary.

The content of the additive is not particularly limited, but from the viewpoint that the effect of the additive is exerted while maintaining the physical properties derived from the polyimide resin (A) and the polyether sulfone resin (B), the content in the polyimide resin composition is usually 50% by mass or less, preferably from 0.0001 to 30% by mass, more preferably from 0.0001 to 15% by mass, and further preferably from 0.001 to 10% by mass.

Although the polyimide resin composition of the present invention can take any form, it is preferably a pellet.

Since the polyimide resin (A) and the polyether sulfone resin (B) have thermoplasticity, for example, the polyimide resin (A) and the polyether sulfone resin (B), and various optional components as necessary can be melt-kneaded in an extruder to extrude a strand, and the strand can then be cut into pellets. A molded article having a desired shape can be easily produced by introducing the obtained pellets into a molding machine and thermoforming by the method described later.

The glass transition temperature of the polyimide resin composition of the present invention is preferably 160° C. or higher, and more preferably 170° C. or higher from the viewpoint of heat resistance, and is preferably 250° C. or lower, more preferably 240° C. or lower, and further preferably 230° C. or lower from the viewpoint of exerting high molding processability, the glass transition temperature. The glass transition temperature can be measured by the same method as described above.

<Tensile Properties>

According to the polyimide resin composition of the present invention, a molded article can be provided that has better toughness than in the case of the polyimide resin (A) alone or the polyether sulfone resin (B) alone.

For example, for tensile fracture strain, using a 1A-type test piece specified in JIS K7161-2: 2014 obtained by molding the polyimide resin composition, the tensile fracture strain measured by carrying out a tensile test at a temperature of 23° C., a distance between grips of 50 mm, and a testing speed of 5 mm/min in accordance with JIS K7161-1: 2014 and K7161-2: 2014, can be preferably 50% or more, more preferably 70% or more, and further preferably 90% or more. Specifically, the tensile fracture strain can be measured by the method described in the examples.

<Bending Properties>

As described above, the polyimide resin composition of the present invention can have improved toughness while maintaining a high level of bending properties. For the bending properties, using the molded article of 80 mm×10 mm×thickness 4 mm specified in ISO 316 obtained by molding the polyimide resin composition, a bending strength and a flexural modulus, measured by carrying out a bending test at a temperature of 23° C. and a testing speed of 2 mm/min in accordance with ISO 178: 2010, can be 100 MPa or more and 2.2 GPa or more, respectively. Specifically, the bending strength and the flexural modulus can be measured by the methods described in the examples.

<Other Properties>

According to the polyimide resin composition of the present invention, a molded article with a higher degree of whiteness than in the case of the polyimide resin (A) alone and the polyether sulfone resin (B) alone can be produced. Therefore, the polyimide resin composition of the present invention and a molded article thereof are expected to also be applied to reflectors and the like. Further, since the polyimide resin composition of the present invention has a performance derived from the polyimide resin (A), which is a crystalline thermoplastic resin, chemical resistance is also good.

[Molded Article]

The present invention provides the molded article containing the polyimide resin composition.

Since the polyimide resin composition of the present invention has thermoplasticity, the molded article of the present invention can be easily produced by heat-molding. Examples of the heat molding method include injection molding, extrusion molding, blow molding, heat press molding, vacuum molding, pneumatic molding, laser molding, welding, and heat adhesion, and the polyimide resin composition of the present invention may be molded by any molding method that includes a heat melting step.

The molding temperature depends on the thermal properties (melting point and glass transition temperature) of the polyimide resin composition, but for example, in injection-molding, molding is possible at a molding temperature of lower than 400° C. and a mold temperature of 220° C. or lower.

The method for producing a molded article preferably includes the step of heat-molding the polyimide resin composition at a temperature of lower than 400° C. Examples of the specific procedure include the following methods.

First, to the polyimide resin (A), the polyether sulfone resin (B) and various optional components as necessary are added and dry blended, then introduced into an extruder, melted at a temperature of preferably less than 400° C., and melt-kneaded in the extruder and extruded to produce pellets. Alternatively, the polyimide resin (A) may be introduced into the extruder, melted at a temperature of preferably less than 400° C., the polyether sulfone resin (B) and various optional components introduced thereto and melt-kneaded with the polyimide resin (A) in the extruder, and extruded to produce the pellets.

The pellets may be dried, then introduced in various kinds of molding machines, and heat-molded preferably at a temperature of lower than 400° C., thereby producing a molded article having a desired shape.

The molded article of the present invention has excellent heat resistance and bending properties and high toughness, and therefore is expected to be developed in applications where importance is placed on impact resistance, vibration control, and the like. For example, the molded article of the present invention can be applied to applications such as sliding members such as gears and bearings, cutting members, structural members such as robot arms, winding coating materials such as electric wires, screws, nuts, packings, speaker diaphragms, reflectors, fifth generation mobile communication system (5G) related members, various films, and the like. Further, as a use similar to that of a polyether sulfone resin, the molded article of the present invention also holds promise in applications in water-treated films and the like.

EXAMPLES

The present invention will be described in more detail with reference to examples below, but the present invention is not limited thereto. Further, various measurements and evaluations in each of the Production Examples and Examples were carried out in the following manner.

<Infrared Spectroscopy (IR Measurement)>

The IR measurement of the polyimide resin was performed with "JIR-WINSPEC 50", produced by JEOL, Ltd.

<Logarithmic Viscosity>

The polyimide resin was dried at from 190 to 200° C. for 2 hours, and then 0.100 g of the polyimide resin was dissolved in 20 mL of concentrated sulfuric acid (96%, produced by Kanto Chemical Co., Inc.) to form a polyimide resin solution, and the measurement was made at 30° C. with a Cannon-Fenske viscometer using the polyimide resin solution as a measurement sample. The logarithmic viscosity was obtained according to the following expression.

$$\mu=\ln[(ts/t_0)/C]$$

$t_0$: elapsed time for flowing concentrated sulfuric acid $t_S$: elapsed time for flowing polyimide resin solution C: 0.5 g/dL <Melting Point, Glass Transition Temperature, Crystallization Temperature, and Exothermic Amount of Crystallization>

The melting point Tm, glass transition temperature Tg, crystallization temperature Tc and the exothermic amount of crystallization ΔHm of the polyimide resin, the polyether sulfone resin or the polyimide resin composition produced in each of the examples were measured with a differential scanning calorimeter ("DSC-6220", produced by SII Nanotechnology, Inc.).

In a nitrogen atmosphere, a thermal history of the following conditions was imposed on the polyimide resin, the polyether sulfone resin or the polyimide resin composition. The condition of the thermal history included the first heating (heating rate: 10° C./min), then cooling (cooling rate: 20° C./min), and then second heating (heating rate: 10° C./min).

The melting point Tm was determined by reading the peak top value of the endothermic peak observed in the second heating. The glass transition temperature (Tg) was determined by reading the value observed in the second heating. The crystallization temperature (Tc) was determined by reading the peak top value of the exothermic peak observed in cooling. Regarding Tm, Tg, and Tc, when multiple peaks were observed, the peak top value of each peak was read.

The exothermic amount of crystallization ΔHm (mJ/mg) was calculated from the area of the exothermic peak observed in cooling.

<Crystallization Half-Time>

The crystallization half-time of the polyimide resin was measured with a differential scanning calorimeter ("DSC-6220", produced by SII Nanotechnology, Inc.).

The polyimide resin was held at 420° C. for 10 minutes in a nitrogen atmosphere so as to completely melt, then quenched at a cooling rate of 70° C./min, and the time required from the appearance of the observed crystallization peak to the peak top thereof was calculated. In Table 1, cases where the crystallization half-time was 20 seconds or less are indicated as "<20".

<Weight Average Molecular Weight and Number Average Molecular Weight>

The weight average molecular weight (Mw) and the number average molecular weight (Mn) of the polyimide resin and the polyether sulfone resin was measured with a gel permeation chromatography (GPC) measurement apparatus "Shodex GPC-101" produced by Showa Denko K.K.

under the following conditions. For the polyether sulfone resin, a polyether sulfone resin powder was used as the measurement sample.

Column: Shodex HFIP-806M

Mobile phase solvent: Hexafluoroisopropanol (HFIP) containing 2 mM sodium trifluoroacetate Column temperature: 40° C.

Flow rate of mobile phase: 1.0 mL/min

Specimen concentration: about 0.1 mass %

Detector: IR detector

Amount of injection: 100 m

Calibration curve: standard PMMA

<Intrinsic Viscosity [η]>

The intrinsic viscosity of the polyether sulfone resin was measured in accordance with JIS K7367-5:2000 by the following method. As the measurement sample, a polyether sulfone resin powder was used.

Solutions of the polyether sulfone resin in N,N-dimethylformamide with concentrations of 0.5 g/dL, 1.0 g/dL, and 1.5 g/dL were prepared. The viscosity of each of those solutions was measured three times using an Ubbelohde viscometer (No. OB) in a constant temperature bath at 25±0.05° C., and the reduced viscosity (unit: dL/g) was calculated from the average value thereof. A calibration curve was drawn with the polyether sulfone resin concentration (g/dL) plotted on the horizontal axis and reduced viscosity (dL/g) plotted on the vertical axis, and the viscosity value extrapolated at a concentration of 0 g/dL was taken as the value of the intrinsic viscosity (units: dL/g).

<Heat Deformation Temperature (HDT)>

Using the polyimide resin, the polyether sulfone resin or the polyimide resin composition produced in each of the examples, molded articles of 80 mm×10 mm×thickness 4 mm were produced and used for measurement by the method described later.

For the measurement, a flatwise test was performed in accordance with JIS K7191-1, 2: 2015. Specifically, the heat deformation temperature was measured at distance between fulcrums of 64 mm, a load of 1.80 MPa, and a heating rate of 120° C./hour using an HDT test instrument "Auto-HDT3D-2" (produced by Toyo Seiki Seisaku-Sho, Ltd.).

<Bending Strength and Flexural Modulus>

Using the polyimide resin, polyether sulfone resin, or polyimide resin composition produced in each of the examples, molded articles of 80 mm×10 mm×thickness 4 mm specified in ISO 316 were produced by the method described later, and used for measurement. The bending test was performed with Bend Graph (produced by Toyo Seiki Seisaku-Sho, Ltd.) in accordance with ISO 178: 2010 at a temperature of 23° C. and a testing speed of 2 mm/min to measure the bending strength and the flexural modulus.

<Tensile Strength, Tensile Modulus, and Tensile Fracture Strain>

Using the polyimide resin, polyether sulfone resin, or polyimide resin composition produced in each of the examples, 1A-type test pieces specified in JIS K7161-2: 2014 were produced and used for measurement by the methods described later. Using a tensile tester (Strograph VG-1E, produced by Toyo Seiki Co., Ltd.), a tensile test was performed at a temperature of 23° C., a distance between grips of 50 mm, and a testing speed of 5 mm/min in accordance with JIS K7161-1: 2014 and K7161-2: 2014, and the tensile strength, tensile modulus, and tensile fracture strain were measured.

<Color Hue>

Pellets of each of the polyimide resin, polyether sulfone resin, or polyimide resin composition produced in each of the examples were used for measurement.

The Lab value and YI value were measured by a reflection method using a color difference meter ("ZE2000", produced by Nippon Denshoku Industries Co., Ltd.). Further, the degree of whiteness was calculated based on the Lab value and the YI value.

The Lab value was measured in accordance with JIS Z8781-4:2013, the YI value was measured in accordance with JIS K7373:2006, and the degree of whiteness was calculated in accordance with JIS Z8715:1999.

Production Example 1 (Production of Polyimide Resin 1)

500 g of 2-(2-methoxyethoxy)ethanol (produced by Nippon Nyukazai Co., Ltd.) and 218.12 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 49.79 g (0.35 mol) of 1,3-bis(aminomethyl) cyclohexane (produced by Mitsubishi Gas Chemical Company, Inc., cis/trans ratio=7/3) and 93.77 g (0.65 mol) of 1,8-octamethylenediamine (produced by Kanto Chemical Co., Inc.) were dissolved in 250 g of 2-(2-methoxyethoxy) ethanol with a 500 mL beaker, thereby preparing a mixed diamine solution. This mixed diamine solution was added into the suspended solution gradually with a plunger pump. Heat was generated due to the drop addition, but the internal temperature was adjusted to be within the range of 40 to 80° C. The dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy)ethanol and 1.284 g (0.010 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and filtered. The obtained polyimide resin powder was washed and filtered with 300 g of 2-(2-methoxyethoxy)ethanol and 300 g of methanol, and then dried in a dryer at 180° C. for 10 hours to obtain 317 g of a powder of crystalline thermoplastic polyimide resin 1 (hereinafter, also simply referred to as "polyimide resin 1").

The measurement of the IR spectrum of polyimide resin 1 showed the characteristic absorption of an imide ring v(C═O) observed at 1768 and 1697 ($cm^{-1}$). The logarithmic viscosity was 1.30 dL/g, Tm was 323° C., Tg was 184° C., Tc was 266° C., the exothermic amount of crystallization was 21.0 mJ/mg, the crystallization half-time was 20 seconds or less, and Mw was 55,000.

Table 1 shows the composition and evaluation results of the polyimide resin 1 of Production Example 1. The values expressed in mol % of the tetracarboxylic acid component and the diamine component in Table 1 are values calculated from the charged amount of each component in production of the polyimide resin.

TABLE 1

| | | Tetracarboxylic acid component (mol % in the total tetracarboxylic acid component) | Diamine component (mol % in total diamine component) | | (1)/{(1) + (2)} (mol %)*1 | Tm | Tg | Tc | Exothermic amount of crystallization ΔHm | Crystallization half-time | |
|---|---|---|---|---|---|---|---|---|---|---|---|
| | | PMDA | 1,3-BAC | OMDA | | (° C.) | (° C.) | (° C.) | (mJ/mg) | (seconds) | Mw |
| Production Example 1 | Polyimide resin 1 | 100 | 35 | 65 | 35 | 323 | 184 | 266 | 21.0 | <20 | 55,000 |

*1: Content ratio (mol %) of repeating structural unit of formula (1) with respect to total of repeating structural unit of formula (1) and repeating structural unit of formula (2) in polyimide resin 1
The abbreviations in the table 1 are as follows.
PMDA; pyromellitic dianhydride
1,3-BAC; 1,3-bis(aminomethyl)cyclohexane
OMDA; 1,8-octamethylenediamine Examples 1 and 2 and Comparative Examples 1 and 2 (Production and Evaluation of Polyimide Resin Composition and Molded Article)

A powder of the polyimide resin 1 obtained in Production Example 1 and a powder of the polyether sulfone resin (B1) ("Sumika Excel 3600P" produced by Sumitomo Chemical Co., Ltd., intrinsic viscosity at 25° C.: 0.307 dL/g, Mn: 8,600, Mw: 16,500, Tg: 222° C.) were dry-blended in the ratio shown in Table 2, and then the mixture was melt-kneaded and extruded using a co-rotating twin-screw kneading extruder ("HK-25D", produced by Parker Corporation, screw diameter=25 mm, L/D=41) at a barrel temperature of 370° C. and a screw rotation speed of 150 rpm. A strand extruded from the extruder was cooled in air and then pelletized with a pelletizer ("Fan Cutter FC-Mini-4/N" produced by Hoshi Plastics Co., Ltd.). The obtained pellets were dried at 150° C. for 12 hours, and then used for injection molding.

The injection-molding was performed at a barrel temperature of 385° C., a mold temperature of 165° C., and a molding cycle of 60 seconds with an injection-molding machine ("ROBOSHOT α-S30iA", produced by FANUC Corporation), thereby preparing a molded article having a desired shape to be used in the various evaluations.

Various evaluations were performed by the methods described above using the obtained pellets and molded articles. The results are shown in Table 2.

Examples 3 to 5 and Comparative Examples 3 and 4 (Production and Evaluation of Polyimide Resin Composition and Molded Article)

Pellets and molded articles were produced in the same manner as in Examples 1 and 2 and Comparative Examples 1 and 2, except that a powder of the polyimide resin 1 obtained in Production Example 1 and a powder of the polyether sulfone resin (B2) ("Sumika Excel 4800P" produced by Sumitomo Chemical Co., Ltd., intrinsic viscosity at 25° C.: 0.389 dL/g, Mn: 7,200, Mw: 16,200, Tg: 221° C.) were used in the proportions shown in Table 2. Various evaluations were performed in the same manner as in Examples 1 and 2 and Comparative Examples 1 and 2. The results are shown in Table 2.

Reference Example 1

A powder of the polyether sulfone resin (B1) ("Sumika Excel 3600P" produced by Sumitomo Chemical Co., Ltd.) was melt-kneaded and extruded at a barrel temperature of 360° C. and a screw rotation speed of 150 rpm using a Labo Plasto Mill (produced by Toyo Seiki Seisaku-Sho, Ltd.). The strand extruded from the extruder was air cooled, and then pelletized with a pelletizer ("Fan Cutter FC-Mini-4/N", produced by Hoshi Plastic Co., Ltd.). The obtained pellets were dried at 160° C. for 6 hours, and then used for injection-molding.

The injection-molding was performed at a barrel temperature of 350° C., a mold temperature of 180° C., and a molding cycle of 60 seconds with an injection-molding machine ("ROBOSHOT α-S30iA", produced by FANUC Corporation), thereby preparing a molded article having a desired shape to be used in the various evaluations.

Various evaluations were performed by the methods described above using the obtained pellets and molded article. The results are shown in Table 2.

Reference Example 2

Pellets and a molded article were produced in the same manner as in Reference Example 1, except that a powder of the polyether sulfone resin (B2) ("Sumika Excel 4800P" produced by Sumitomo Chemical Co., Ltd.) was used instead of the powder of the polyether sulfone resin (B1). Various evaluations were performed in the same manner as in Reference Example 1. The results are shown in Table 2.

Reference Example 3

A powder of the polyimide resin 1 obtained in Production Example 1 was melt-kneaded and extruded at a barrel temperature of 360° C. and a screw rotation speed of 150 rpm using a Labo Plasto Mill (produced by Toyo Seiki Seisaku-Sho, Ltd.). The strand extruded from the extruder was air cooled, and then pelletized with a pelletizer ("Fan Cutter FC-Mini-4/N", produced by Hoshi Plastic Co., Ltd.). The obtained pellets were dried at 150° C. for 12 hours, and then used for injection-molding.

The injection-molding was performed at a barrel temperature of 350° C., a mold temperature of 200° C., and a molding cycle of 50 seconds with an injection-molding machine ("ROBOSHOT α-S30iA", produced by FANUC Corporation), thereby preparing a molded article having a desired shape to be used in the various evaluations.

Various evaluations were performed by the methods described above using the obtained pellets and molded article. The results are shown in Table 2.

TABLE 2

| | | | Reference Example 1 | Example 1 | Example 2 | Comparative Example 1 | Comparative Example 2 | Reference Example 2 |
|---|---|---|---|---|---|---|---|---|
| Resin compositional makeup (parts by mass) | (A1) Polyimide resin 1 | | 0 | 30 | 50 | 70 | 90 | 0 |
| | (B1) Polyether sulfone resin (3600P) | | 100 | 70 | 50 | 30 | 10 | — |
| | (B2) Polyether sulfone resin (4800P) | | — | — | — | — | — | 100 |
| Thermal properties | HDT (load1.80 (MPa) | ° C. | 206 | 198 | 191 | 184 | 180 | 210 |
| | Melting point (Tm) | ° C. | | 321 | 321 | 321 | 320 | — |
| | Glass transition temperature (Tg) | ° C. | 222 | 215 | 216 | 218 | 188 | 221 |
| | Crystallization temperature (Tc) | ° C. | — | 251 | 276, 251 | 273 | 269 | — |
| | Exothermic amount of crystallization (ΔHm) | mJ/mg | — | 5.9 | 10.8 | 17.7 | 20.7 | — |
| Mechanical properties | Bending strength | MPa | 145 | 130 | 126 | 130 | 133 | 136 |
| | Flexural modulus | GPa | 2.6 | 2.5 | 2.5 | 2.7 | 3.0 | 2.6 |
| | Tensile strength | MPa | 85 | 82 | 83 | 80 | 83 | 85 |
| | Tensile modulus | GPa | 2.7 | 2.5 | 2.4 | 2.4 | 2.5 | 2.5 |
| | Tensile fracture strain | % | 6 | 96 | 109 | 9 | 6 | 119 |
| Color hue | L | — | 47.9 | 57.8 | 55.0 | 52.9 | 45.8 | 38.2 |
| | a | — | 0.2 | 6.8 | 8.0 | 7.8 | 7.4 | 1.7 |
| | b | — | 7.6 | 20.7 | 20.1 | 18.8 | 17.6 | 8.2 |
| | YI | — | 28.8 | 72.8 | 76.0 | 74.4 | 80.6 | 41.9 |
| | Degree of whiteness | — | 47 | 53 | 50 | 49 | 43 | 38 |

| | | | Example 3 | Example 4 | Example 5 | Comparative Example 3 | Comparative Example 4 | Reference Example 3 |
|---|---|---|---|---|---|---|---|---|
| Resin compositional makeup (parts by mass) | (A1) Polyimide resin 1 | | 10 | 30 | 50 | 70 | 90 | 100 |
| | (B1) Polyether sulfone resin (3600P) | | — | — | — | — | — | — |
| | (B2) Polyether sulfone resin (4800P) | | 90 | 70 | 50 | 30 | 10 | — |
| Thermal properties | HDT (load1.80 (MPa) | ° C. | 207 | 203 | 194 | 184 | 177 | 169 |
| | Melting point (Tm) | ° C. | 321 | 321 | 321 | 320 | 320 | 323 |
| | Glass transition temperature (Tg) | ° C. | 219 | 220 | 220 | 217 | 190 | 184 |
| | Crystallization temperature (Tc) | ° C. | 246 | 249 | 264, 250 | 267 | 266 | 266 |
| | Exothermic amount of crystallization (ΔHm) | mJ/mg | 3.5 | 7.8 | 13.1 | 18.2 | 23.9 | 21.0 |
| Mechanical properties | Bending strength | MPa | 135 | 133 | 132 | 128 | 128 | 120 |
| | Flexural modulus | GPa | 2.6 | 2.6 | 2.7 | 2.7 | 2.8 | 2.6 |
| | Tensile strength | MPa | 84 | 83 | 81 | 81 | 81 | 80 |
| | Tensile modulus | GPa | 2.5 | 2.5 | 2.6 | 2.6 | 2.5 | 2.5 |
| | Tensile fracture strain | % | 127 | 138 | 144 | 8 | 7 | 21 |
| Color hue | L | — | 55.5 | 57.4 | 54.9 | 52.8 | 47.3 | 48.1 |
| | a | — | 3.7 | 5.6 | 6.6 | 7.1 | 7.3 | 6.3 |
| | b | — | 17.7 | 19.4 | 19.0 | 18.5 | 18.1 | 17.8 |
| | YI | — | 62.0 | 67.6 | 70.8 | 72.6 | 79.9 | 75.8 |
| | Degree of whiteness | — | 52 | 53 | 51 | 49 | 44 | 45 |

The details of each component shown in Table 2 are as follows.

<Polyimide resin (A)>

(A1) Polyimide resin 1: Crystalline thermoplastic polyimide resin 1 obtained in Production Example 1

<Polyether sulfone resin (B)>

(B1) Polyether sulfone resin (3600P): "Sumika Excel 3600P" produced by Sumitomo Chemical Co., Ltd., R in formula (I) is Cl, intrinsic viscosity at 25° C.: 0.307 dL/g, Mn: 8,600, Mw: 16,500, Tg: 222° C.

(B2) Polyether sulfone resin (4800P): "Sumika Excel 4800P" produced by Sumitomo Chemical Co., Ltd., R in formula (I) is Cl, intrinsic viscosity at 25° C.: 0.389 dL/g, Mn: 7,200, Mw: 16,200, Tg: 221° C.

As shown in Table 2, the molded articles composed of the polyimide resin compositions of Examples 1 and 2, which contained the polyimide resin (A1) and the polyether sulfone resin (B1) in a mass ratio range of 0.1/99.9 to 65/35, had better tensile fracture strain than the molded articles of Comparative Examples 1 and 2, in which the ratio of the polyimide resin (A1) and the polyether sulfone resin (B1) was outside the aforementioned range, the molded article of Reference Example 1, which consisted only of the polyether sulfone resin (B1), and the molded article of Reference Example 3, which consisted only of the polyimide resin (A1).

Similarly, the molded articles composed of the polyimide resin compositions of Examples 3 to 5, which contained the polyimide resin (A1) and the polyether sulfone resin (B2) in a mass ratio range of 0.1/99.9 to 65/35, had better tensile fracture strain than the molded articles of Comparative Examples 3 and 4, in which the ratio of the polyimide resin (A1) and the polyether sulfone resin (B2) was outside the aforementioned range, the molded article of Reference Example 2, which consisted only of the polyether sulfone resin (B2), and the molded article of Reference Example 3, which consisted only of the polyimide resin (A1).

Further, it can be seen that the polyimide resin compositions of Examples 1 to 5 had a higher L value and degree of whiteness than that of the polyimide resin compositions of the comparative examples and the resins of the reference examples.

In addition, using the pellets obtained in Example 1, Example 2, and Comparative Example 1, the dispersion state of the polyimide resin (A1) and the polyether sulfone resin (B1) in each pellet was confirmed by the following method.

As shown in FIG. 1, the pellets were cut parallel to the flow direction (MD) of the pellets (that is, so that the TD cross-section would appear) using a microtome ("ULTRA-CUT E", produced by REICHERT-JUNG LIMITED) to produce ultra-thin pieces. In FIG. 1, reference numeral 1 denotes the pellet and reference numerals 2 denote the ultra-thin pieces.

Figure 2:
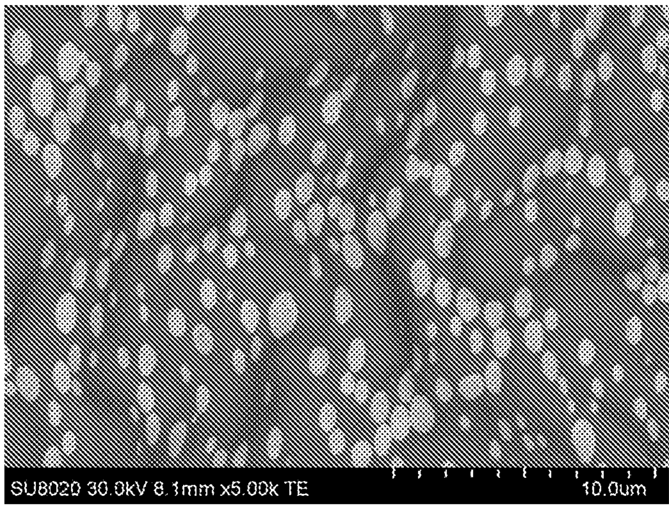
FIG. 2 is a micrograph of when a cross-section cut parallel to the flow direction (MD) of the polyimide resin composition (pellets) of Example 1 is observed by a FE-STEM.
Figure 3:
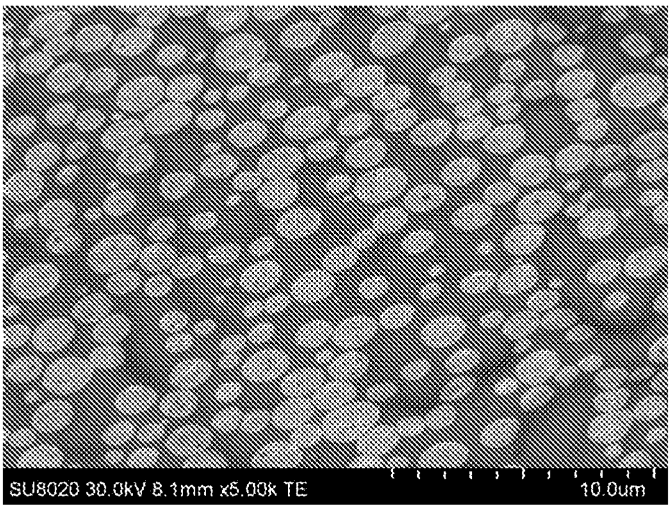
FIG. 3 is a micrograph of when a cross-section cut parallel to the MD of the polyimide resin composition (pellets) of Example 2 is observed by a FE-STEM.
Figure 4:
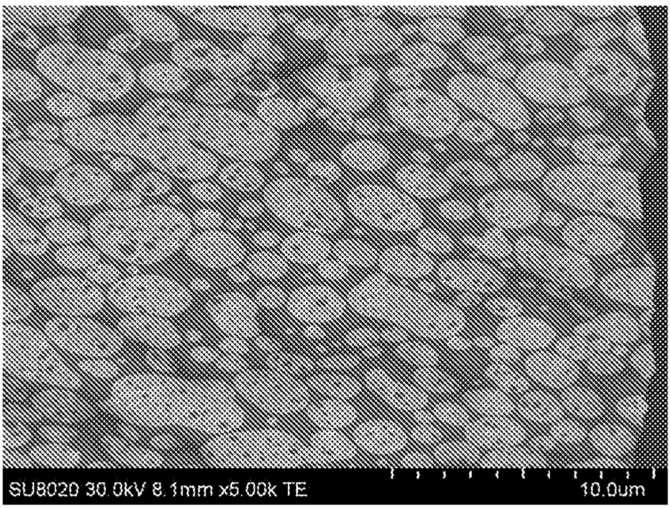
FIG. 4 is a micrograph of when a cross-section cut parallel to the MD of the polyimide resin composition (pellets) of Comparative Example 1 is observed by a FE-STEM.

After dyeing the cut surface with ruthenium tetroxide in the air phase for 30 minutes, the pieces were observed at an acceleration voltage of 30 kV and an observation magnification of 5,000 times using a field-emission scanning transmission electron microscope (FE-STEM, "Gemini SEM500", produced by ZEISS) (FIGS. 2 to 4). In each observation image, the portions where the dye was darker were determined to be composed of the polyether sulfone resin (B1), which is easily stained with ruthenium tetroxide.

FIG. 2 is a micrograph of the pellets of Example 1 (mass ratio [(A1)/(B1)]=30/70), FIG. 3 is a micrograph of the pellets of Example 2 (mass ratio [(A1)/(B1)]=50/50), and FIG. 4 is a micrograph of the pellets of Comparative Example 1 (mass ratio [(A1)/(B1)]=70/30).

From FIGS. 2 to 4, it can be seen that in the pellets obtained in Example 1, Example 2, and Comparative Example 1, the polyimide resin (A1) and the polyetherimide sulfone resin (B1) are uniformly dispersed, and that a sea-island structure as a basic structure is formed in which the polyimide resin (A1) constitutes the "islands" and the polyetherimide sulfone resin (B1) constitutes the "sea". In addition, it is possible to form a mode in which a lake is in the island or a mode in which a bridge is formed between islands.

Figure 5:
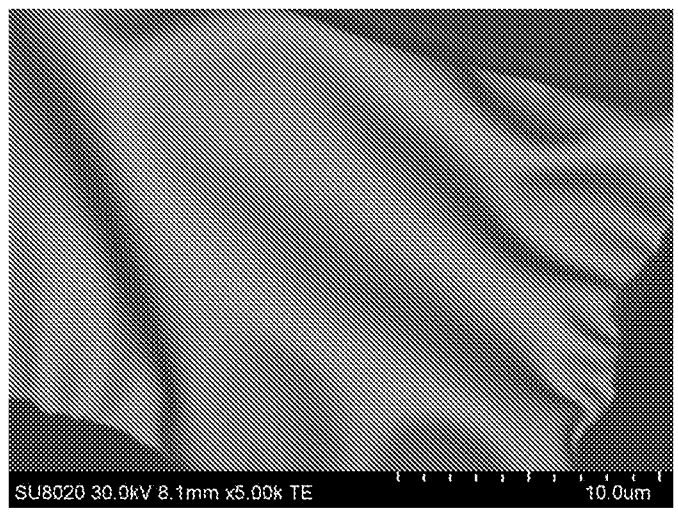
FIG. 5 is a micrograph of when a cross-section cut parallel to the MD of pellets of the polyether sulfone resin (B1) of Reference Example 1 is observed by a FE-STEM.

It is noted that as a control, an ultra-thin piece was prepared in the same manner as described above using pellets consisting of only the polyether sulfone resin (B1) obtained in Reference Example 1. FIG. 5 is a micrograph of this ultra-thin piece observed by a FE-STEM without being dyed with ruthenium tetroxide.

INDUSTRIAL APPLICABILITY

The polyimide resin composition and molded article of the present invention have excellent heat resistance and bending properties and high toughness, and therefore is expected to be developed in applications where importance is placed on impact resistance, vibration control, and the like. For example, the polyimide resin composition and molded article of the present invention can be applied to applications such as sliding members such as gears and bearings, cutting members, structural members such as robot arms, winding coating materials such as electric wires, screws, nuts, packings, speaker diaphragms, reflectors, fifth generation mobile communication system (5G) and sixth generation mobile communication system (6G) related members, various films, and the like. Further, as a use similar to that of a polyether sulfone resin, the polyimide resin composition and molded article of the present invention also holds promise in applications in water-treated films and the like.

The invention claimed is:

1. A polyimide resin composition comprising a polyimide resin (A) and a polyether sulfone resin (B), wherein the polyimide resin (A) comprises a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) is 20 to 70 mol %, a total content of the polyimide resin (A) and the polyether sulfone resin (B) in the polyimide resin composition is 70% by mass or more, based on a total mass of the polyimide resin composition, a mass ratio of the polyimide resin (A) to the polyether sulfone resin (B), [(A)/(B)], is 10/90 to 60/40:

(1)

(2)

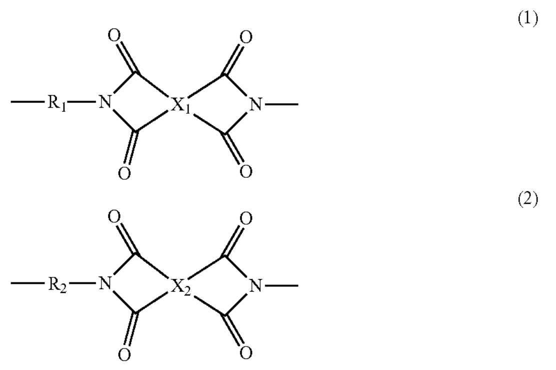

wherein $R_1$ represents a divalent group having from 6 to 22 carbon atoms containing at least one alicyclic hydrocarbon structure;

$R_2$ represents a divalent chain aliphatic group having from 5 to 16 carbon atoms; and $X_1$ and $X_2$ each independently represent a tetravalent group having from 6 to 22 carbon atoms containing at least one aromatic ring, the polyether sulfone resin (B) is a resin having a structure represented by formula (I):

(I)

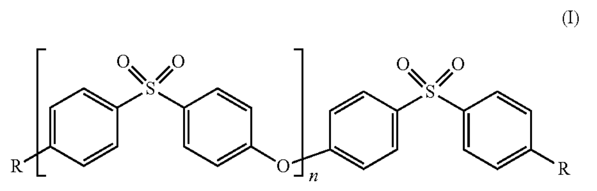

wherein R represents an end group, and is Cl or OH and n represents an average number of repeating structural units, and is a number of two or more, and wherein a tensile fracture strain, using a 1A-type test piece specified in JIS K7161-2: 2014 obtained by molding the polyimide resin composition to form a molded article, the tensile fracture strain measured by carrying out a tensile test at a temperature of 23° C., a distance between grips of 50 mm, and a testing speed of 5 mm/min in accordance with JIS K7161-1:2014 and K7161-2:2014, is 50% or more.

2. The polyimide resin composition according to claim 1, wherein the mass ratio of the polyimide resin (A) to the polyether sulfone resin (B), [(A)/(B)], is 15/85 to 60/40.

3. The polyimide resin composition according to claim 1, wherein the polyether sulfone resin (B) has an intrinsic viscosity at 25° C. of 0.20 to 1.00 dL/g.

4. A molded article comprising the polyimide resin composition according to claim 1.

5. The polyimide resin composition according to claim 1, wherein the mass ratio of the polyimide resin (A) to the polyether sulfone resin (B), [(A)/(B)], is 30/70 to 60/40.

6. The polyimide resin composition according to claim 1, wherein, using the molded article of 80 mm×10 mm×thickness 4 mm specified in ISO 316 obtained by molding the polyimide resin composition, a bending strength is 100 MPa or more and a flexural modulus is 2.2 GPa or more, each measured using a bending test at a temperature of 23° C. and a testing speed of 2 mm/min in accordance with ISO 178:2010.

* * * * *